(12) United States Patent
Nylund

(10) Patent No.: US 6,711,658 B2
(45) Date of Patent: Mar. 23, 2004

(54) ARCHITECTURE AND CONFIGURING METHOD FOR A COMPUTER EXPANSION BOARD

(75) Inventor: Helge Nylund, Fort Collins, CO (US)

(73) Assignee: Hyundai Electronics America, San Jose, CA (US)

( * ) Notice: Subject to any disclaimer, the term of this patent is extended or adjusted under 35 U.S.C. 154(b) by 404 days.

(21) Appl. No.: 09/777,264

(22) Filed: Feb. 5, 2001

(65) Prior Publication Data

US 2001/0039608 A1 Nov. 8, 2001

Related U.S. Application Data

(63) Continuation of application No. 08/570,256, filed on Dec. 11, 1995, now Pat. No. 6,240,496, which is a continuation of application No. 08/152,264, filed on Nov. 12, 1993, now abandoned, which is a continuation of application No. 07/440,826, filed on Nov. 24, 1989, now abandoned.

(51) Int. Cl.[7] ............................................. G06F 12/02
(52) U.S. Cl. ..................................................... 711/170
(58) Field of Search ............................. 711/170, 171, 711/172

(56) References Cited

U.S. PATENT DOCUMENTS

| 4,439,827 A | 3/1984 | Wilkes .................... 364/200 |
| 4,571,671 A | 2/1986 | Burns et al. ............. 364/200 |
| 4,703,198 A | 10/1987 | Porter et al. ............. 307/473 |
| 4,712,176 A | 12/1987 | Fredericks et al. ........ 364/200 |
| 4,720,784 A | 1/1988 | Radhakrishnan et al. ... 364/200 |
| 4,727,475 A | 2/1988 | Kiremidjian .............. 364/200 |
| 4,761,647 A | 8/1988 | Hallenbeck et al. ... 340/825.22 |
| 4,774,422 A | 9/1988 | Donaldson et al. ......... 307/475 |
| 4,882,702 A | * 11/1989 | Struger et al. ............. 364/900 |
| 4,908,789 A | 3/1990 | Blokkum et al. ........... 364/900 |
| 4,964,038 A | 10/1990 | Louis et al. ................ 364/200 |
| 4,979,144 A | 12/1990 | Mizuta ....................... 364/900 |
| 4,980,850 A | 12/1990 | Morgan ..................... 364/900 |
| 5,027,313 A | 6/1991 | Culley ........................ 364/900 |
| 5,038,320 A | 8/1991 | Heath et al. ................ 364/900 |
| 5,111,423 A | 5/1992 | Kopec, Jr. et al. ......... 395/500 |
| 5,175,836 A | 12/1992 | Morgan ..................... 395/425 |
| 5,311,451 A | * 5/1994 | Barrett ....................... 364/550 |
| 6,240,496 B1 | 5/2001 | Nylund ....................... 711/170 |

* cited by examiner

Primary Examiner—Kevin L. Ellis
(74) Attorney, Agent, or Firm—Townsend and Townsend and Crew LLP

(57) ABSTRACT

An expansion board architecture and method for configuring the board. The board comprises a controller chip, a parallel bus, a memory for storing a plurality of configuration data bits, and a control line. The controller chip controls the operation of the board and has an internal register for storing a plurality of data bits. The parallel bus transfers data bits between the controller chip and other components on the board and is connected to the memory. The control line is connected between the controller and the memory for enabling the output of the memory to transfer the configuration bits to the register over the bus.

25 Claims, 2 Drawing Sheets

ARCHITECTURE AND CONFIGURING METHOD FOR A COMPUTER EXPANSION BOARD

This application is a continuation of U.S. application Ser. No. 08/570,256, filed Dec. 11, 1995 now U.S. Pat. No. 6,240,496 which is a continuation of U.S. application Ser. No. 08/152,264, filed Nov. 12, 1993 (now abandoned) which is a continuation of U.S. application Ser. No. 07/440,826, filed Nov. 24, 1989 (now abandoned).

The present invention relates to an architecture for computer expansion boards. More particularly, it relates to an architecture which reduces the number of pins required to transfer configuration bits within such board.

BACKGROUND OF THE INVENTION

Many computer systems, such as the personal computer (PC) may be purchased with differing levels of functionality and/or storage capacity. Increased functionality and/or storage capacity may be obtained through upgrading a basic unit by connecting add-on boards to "expansion slots" provided on the PC. A typical expansion board is available to increase the memory capacity of the PC. Other expansion boards provide additional or supplemental processing power and/or provide interface capabilities for a variety of input/output (I/O) functions. Many such expansion boards include a microprocessor or controller to perform a designated function.

When an expansion board is added to a PC, the board may need to be provided with certain information that defines its relationship to the host or to other parts of the system. For example, a memory board that is to be addressable by the host must be provided with its starting and ending address so that it can function appropriately with respect to the other memory in the system. Other expansion boards may also have addressable memory space which requires a starting and ending address. In addition, there may be other information required by such other boards. For example, an expansion board for connecting the host to a local area network (LAN) may need information specifying its network node number, defining its interrupt level, etc.

The bits of data which define the information provided to the board are referred to as configuration bits and the act of providing the data bits to the board is referred to as configuring the board. Some boards are configured by manually operated switches which are connected to the board. These switches can be set prior to attaching the board to the host computer. When the board is powered up, the switches are read by the on board microprocessor or controller and the configuration information stored in the appropriate register for use as needed.

In the past, the on board microprocessor or controller received the configuration bits on dedicated lines. Since the microprocessor or controller is typically implemented as an integrated circuit chip, each line requires an additional pin. The number of pins used solely for configuration bits will vary but in some LAN cards is thirty-two. Together with the various control, data and address lines, the total number of pins can exceed one hundred. In general, the cost of a chip increases with an increase in the number of pins. In addition, the cost of the board to which the chip is attached is also more expensive in order to accommodate the extra pins.

OBJECTS OF THE INVENTION

It is therefore an object of the present invention to provide a new and improved circuit board for connecting to a host computer.

It is another object of the present invention to provide an enhancement board having a controller chip with a reduced number of pins.

It is a further object of the present invention to provide a new and improved method for configuring a circuit board connectable to a host computer.

It is yet another object of the present invention to provide an improved architecture for configuring an enhancement board.

SUMMARY OF THE INVENTION

One form of the present invention is a circuit board for connecting to a host computer. The board comprises a controller chip, a parallel bus, a memory for storing a plurality of configuration data bits, and a control line. The controller chip controls the operation of the board and has an internal register for storing a plurality of data bits. The parallel bus transfers data bits between the controller chip and other components on the board and is connected to the memory. The control line is connected between the controller and the memory for enabling the output of the memory to transfer the configuration bits to the internal register over the bus.

Another form of the present invention is a method for configuring a circuit board connectable to a host computer. The circuit board has a controller chip, an internal parallel data bus connected to the chip, and a memory connected to the bus. The method comprises programming the configuration data bits into the memory, providing a control signal to the memory, and transferring the configuration data bits to the controller over the bus.

DESCRIPTION OF A PREFERRED EMBODIMENT

Figure 1A:
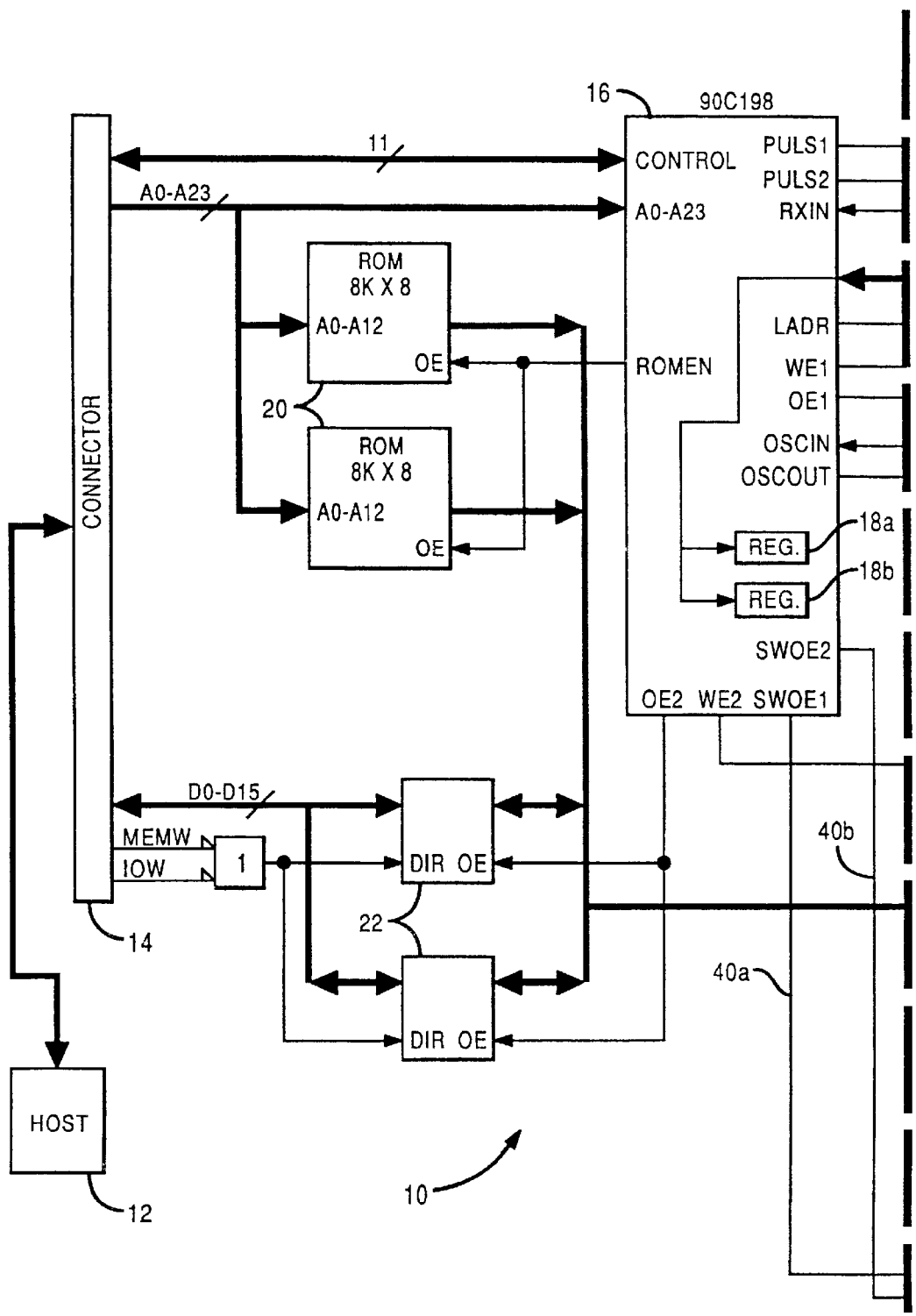
FIGS. 1A and 1B show a block diagram of an expansion circuit board which embodies the present invention.
Figure 1B:
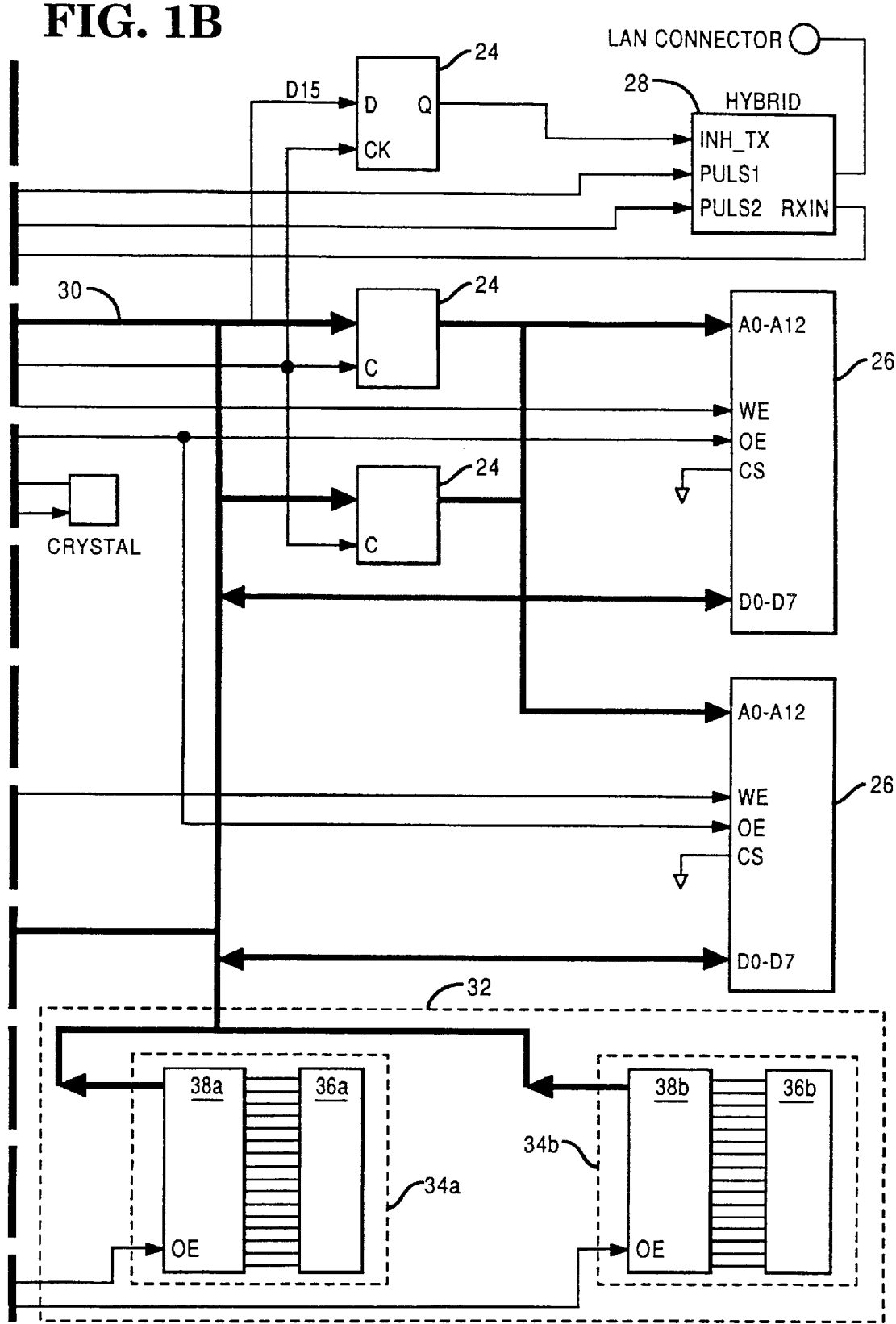

FIGS. 1A and 1B show an expansion or circuit board 10 for connecting to a host computer 12 by means of a connector 14. It will be clear from the following discussion that the architecture and method of the present invention has applicability to a variety of expansion boards. In the embodiment described herein, circuit board 10 is a LAN board, and, more particularly, is a board for interfacing a PC to an ARCNET network. (ARCNET is a type of LAN which employs a token passing system and in which all nodes hear all messages but only respond to those messages addressed to them.)

Circuit board 10 includes a controller 16. In the described embodiment, controller 16 is a 90C198 ARCNET Controller chip available from NCR Microelectronics Products, 2001 Danfield Court, Fort Collins, Colo. 80525. Controller chip 16 controls the operation of board 10. Chip 16 has internal registers 18a and 18b, each capable of storing a plurality of data bits. Other components of board 10 include ROMs 20, transceivers 22, latches 24, RAMs 26, and a transceiver hyprid 28, connected as shown. Circuit board 10 also includes an internal parallel bus 30 multiplexed for transferring both address and data bits between controller 16 and other components on board 10. For example, each RAM 26 has an address port A0–A12 connected to bus 30 through latches 24, and a data port D0–D7 connected to bus 30.

Circuit board 10 also includes a memory 32 for storing a plurality of configuration control bits as will be explained.

Memory 32 is connected to bus 30 and includes memory banks 34a and 34b. Each memory bank 34a and 34b has a plurality of manual switches 36a and 36b, respectively, for programming configuration data into memory 32. Each memory bank 34a and 34b also has a plurality of tri-state buffers 38a and 38b, respectively. Buffers 38a and 38b are connected between switches 36a and 36b, respectively, and bus 30. Other means for programming configuration data bits into memory 32 other than manual switches 36a and 36b are within the scope of the present invention. For example, memory banks 34a and 34b could consist of a programmable array logic (PAL). A PAL will provide a single fixed configuration. This means that the PAL would need to be replaced in order to change the address space.

Control lines 40a and 40b are connected between controller 16 and tri-state buffers 38a and 38b, respectively.

In operation, configuration data bits are programmed into memory banks 34a and 34b by setting the manual switches 36a and 36b, respectively. For example, some of the configuration data bits define the address space occupied by board 10 with respect to host computer 12. The information defining the address space of the memory within board 10 is provided to board 10 by setting a plurality of the switches 36a and/or 36b. Typically, switches 36a and 36b are set prior to board 10 being connected to host computer 12. However, it may be possible to first connect board 10 to host computer 12.

When power is provided to board 10, controller 16 executes a series of microinstructions. These instructions include the serial generation of control signals to memory banks 34a and 34b over control lines 40a and 40b, respectively. When the first control signal over control line 40a is received by tri-state buffer 38a, its output is enabled and the configuration data bits in buffer 38a are transferred in parallel over bus 30 to register 18a within controller 16. Similarly, when the second control signal over control line 40b is received by tri-state buffer 38b, its output is enabled and the configuration data bits in buffer 38b are transferred in parallel over bus 30 to register 18b within controller 16. In this manner, all of the configuration data bits are transferred into controller chip 16 over bus 30. The only pins over and above those required for the normal operation of controller chip 16 are those associated with control lines 40a and 40b. Once the configuration data bits are written into registers 18a and 18b, controller 16 will continue its power up routine utilizing the configuration data bits to configure board 10.

It will be clear to those skilled in the art that the present invention is not limited to the specific embodiment disclosed and illustrated herein. For example, subject to the width of bus 30 and the number of configuration data bits required by board 10, any number of memory banks 34 and corresponding control lines 40 may be employed. In addition, the term "controller", as used herein, is intended to include any microprocessor.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A circuit board connectable to a host computer, said circuit board comprising:
   a controller for controlling said circuit board, wherein said controller comprises at least one internal register for storing a plurality of configuration data bits;
   a parallel bus operable to transfer data between said controller and other components disposed on said circuit board;
   a memory for storing said plurality of configuration data bits, wherein said memory is disposed on said circuit board and wherein said memory is electrically coupled to said parallel bus;
   a control line for directly coupling said controller and said memory so as to be operable to enable said memory to transfer said configuration data bits to said register over said parallel bus;
   wherein said circuit board is operable when coupled to a host computer to transfer said configuration data bits from said memory to said internal register independently of a command from said host computer.

2. The circuit board of claim 1 wherein said controller comprises:
   a plurality of said internal registers;
   wherein said memory is divided into a plurality of memory banks, each of said plurality of memory banks storing a plurality of configuration data bits for a respective one of said internal registers.

3. The circuit board of claim 2 and further comprising:
   a plurality of control lines, each of said plurality of control lines coupled to said controller and to one of said respective memory banks so as to enable an output of said respective memory bank to transfer configuration data bits to a respective one of said plurality of internal registers over said parallel bus.

4. The circuit board of claim 1 and further comprising:
   a data port coupled to said parallel bus;
   an address port coupled to said parallel bus.

5. The circuit board of claim 1 and further comprising:
   a plurality of switches electrically coupled to said memory and operable to define said configuration data bits.

6. The circuit board of claim 1 wherein said configuration data bits are operable to define an address for said circuit board for coupling to a host computer.

7. The circuit board of claim 1 and further comprising:
   a tri-state buffer electrically coupled between said memory and said parallel bus; and
   wherein said control line is operable to electrically couple said controller to said tri-state buffer.

8. A circuit board connectable to a host computer, said circuit board comprising:
   a controller for controlling components disposed on said circuit board;
   a register disposed in said controller;
   a bus operable to transfer data between said controller and at least one other component disposed on said circuit board;
   a memory disposed on said circuit board so as to be electrically coupled to said bus for storing a plurality of configuration data bits;
   a control line for directly coupling said controller and said memory so as to be operable to enable said memory to transfer said configuration data bits to said register over said bus;
   wherein said controller is operable to cause said configuration data bits to be transferred from said memory to said register independently of a command from said host computer.

9. The circuit board as described in claim 8 and further comprising:
   a plurality of switches electrically coupled to said memory.

10. The circuit board as described in claim 9 wherein said plurality of switches electrically coupled to said memory define an address space occupied by said circuit board with respect to said host computer.

11. The circuit board as described in claim 8 and further comprising:
   a buffer for storing said configuration data bits.

12. The circuit board as described in claim 8 and further comprising:
   code for use by said controller operable to cause said configuration data bits to be transferred from said memory to said controller.

13. The circuit board as described in claim 12 wherein said code is operable to cause said configuration data bits to be transferred from said memory to said controller upon powering up said circuit board and prior to receiving a command from said host computer.

14. A method of configuring a circuit board connectable to a host computer, said method comprising:
   providing a controller for controlling said circuit board, said controller comprising at least one internal register for storing a plurality of configuration data bits;
   providing a parallel bus operable to transfer data between said controller and other components disposed on said circuit board;
   providing a memory for storing said plurality of configuration data bits;
   disposing said memory on said circuit board so as to permit electrical coupling of said memory to said parallel bus;
   providing a control line for directly coupling said controller and said memory so as to be operable to enable said memory to transfer said configuration data bits to said register over said parallel bus;
   transferring said configuration data bits from said memory to said internal register independently of a command from said host computer.

15. The method of claim 14 and further comprising:
   providing a plurality of said internal registers;
   providing said memory as a plurality of memory banks.

16. The method of claim 15 and further comprising:
   providing a plurality of control lines;
   electrically coupling each of said plurality of control lines between said controller and one of said respective memory banks.

17. The method of claim 14 and further comprising:
   providing a data port coupled to said parallel bus;
   providing an address port coupled to said parallel bus.

18. The method of claim 14 and further comprising:
   providing a plurality of switches electrically coupled to said memory and operable to define said configuration data bits.

19. The method of claim 14 and further comprising:
   utilizing said configuration data bits to define an address for said circuit board relative to said host computer.

20. The method of claim 14 and further comprising:
   providing a tri-state buffer electrically coupled between said memory and said parallel bus; and
   configuring said control line to be operable to electrically couple said controller to said tri-state buffer.

21. A method of configuring a circuit board connectable to a host computer, said method comprising:
   providing a controller for controlling components disposed on said circuit board;
   providing said controller with an internal register;
   providing a memory disposed on said circuit board;
   storing configuration data bits in said memory;
   directly coupling said controller to said memory via a control line;
   transferring said configuration data bits from said memory to said internal register independently of a command from said host computer.

22. The method as described in claim 21 wherein said transferring said configuration data bits comprises:
   transferring said configuration data bits upon powering up said circuit board.

23. The method as described in claim 21 wherein said transferring said configuration data bits comprises:
   transferring said configuration data bits after powering up said circuit board and prior to receiving a command from said host computer.

24. The method as described in claim and 21 further comprising:
   utilizing said configuration data bits to configure said circuit board after said transferring said configuration data bits from said memory to said internal register.

25. The method as described in claim 21 and further comprising:
   utilizing said configuration data bits as an address for determining when said circuit board is addressed by said host computer.

* * * * *